(12) United States Patent
Qi et al.

(10) Patent No.: US 11,191,042 B2
(45) Date of Patent: Nov. 30, 2021

(54) EXCHANGING RANGING AND LOCATION INFORMATION AMONG PEER-TO-PEER DEVICES

(71) Applicant: Intel Corporation, Santa Clara, CA (US)

(72) Inventors: Emily Qi, Gig Harbor, WA (US); Carlos Cordeiro, Portland, OR (US); Jonathan Segev, Tel Mond (IL)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 16/261,888

(22) Filed: Jan. 30, 2019

(65) Prior Publication Data

US 2019/0335404 A1 Oct. 31, 2019

Related U.S. Application Data

(63) Continuation of application No. 14/575,664, filed on Dec. 18, 2014, now abandoned.

(60) Provisional application No. 62/085,970, filed on Dec. 1, 2014.

(51) Int. Cl.
*H04W 56/00* (2009.01)
*H04W 8/00* (2009.01)
*H04W 4/021* (2018.01)
*H04L 29/08* (2006.01)

(52) U.S. Cl.
CPC ............. *H04W 56/00* (2013.01); *H04L 67/16* (2013.01); *H04W 4/021* (2013.01); *H04W 8/005* (2013.01)

(58) Field of Classification Search
CPC ...... H04W 56/00; H04W 8/005; H04W 4/021; H04L 67/16
See application file for complete search history.

(56) References Cited

U.S. PATENT DOCUMENTS

| 8,982,799 B2* | 3/2015 | Yuk ...................... H04W 72/042 370/328 |
| 9,143,979 B1* | 9/2015 | Lambert ................ H04W 8/005 |
| 10,021,554 B2* | 7/2018 | Abraham .............. H04W 8/005 |
| 2011/0110440 A1* | 5/2011 | Kwon ................... H04L 5/0096 375/259 |
| 2011/0317569 A1* | 12/2011 | Kneckt ............. H04W 74/0833 370/252 |

(Continued)

*Primary Examiner* — Jae Y Lee
*Assistant Examiner* — Chuong M Nguyen
(74) *Attorney, Agent, or Firm* — Eversheds Sutherland (US) LLP (57) ABSTRACT

In some embodiments, a first user device may synchronize a time associated with a second user device. The first user device may generate a neighbor awareness network (NAN) service discovery frame. The first user device may transmit the NAN service discovery frame to the second user device. The first user device may receive a request frame from the second user device based at least in part on transmitting the NAN service discovery frame, wherein the request frame comprises a request for ranging or location information from the first user device. The first user device may receive a NAN service discovery frame from the second user device, wherein the NAN service discovery frame comprises a request for ranging or location information from the first user device. The first user device may transmit a response frame comprising the ranging or location information in response to the received request frame.

19 Claims, 6 Drawing Sheets

(56) References Cited

U.S. PATENT DOCUMENTS

| | | | |
|---|---|---|---|
| 2012/0243524 A1* | 9/2012 | Verma | H04W 48/08 |
| | | | 370/338 |
| 2013/0331135 A1* | 12/2013 | Novak | H04W 8/005 |
| | | | 455/500 |
| 2014/0254426 A1* | 9/2014 | Abraham | H04W 52/0229 |
| | | | 370/254 |
| 2014/0269658 A1* | 9/2014 | Sadasivam | H04W 4/80 |
| | | | 370/338 |
| 2015/0109961 A1* | 4/2015 | Patil | H04W 48/18 |
| | | | 370/254 |
| 2015/0139213 A1* | 5/2015 | Abraham | H04L 69/28 |
| | | | 370/338 |
| 2015/0200738 A1* | 7/2015 | Wetterwald | H04W 16/02 |
| | | | 370/442 |
| 2015/0223047 A1* | 8/2015 | Abraham | H04W 52/0216 |
| | | | 370/328 |
| 2015/0264551 A1* | 9/2015 | Ko | H04L 5/0082 |
| | | | 370/329 |
| 2015/0350027 A1* | 12/2015 | Raissinia | H04W 56/0015 |
| | | | 455/517 |
| 2015/0358800 A1* | 12/2015 | Park | H04W 52/0225 |
| | | | 370/311 |
| 2016/0021560 A1* | 1/2016 | Reshef | H04W 24/10 |
| | | | 370/338 |

* cited by examiner

EXCHANGING RANGING AND LOCATION INFORMATION AMONG PEER-TO-PEER DEVICES

RELATED APPLICATIONS

This application is a continuation of U.S. application Ser. No. 14/575,664, filed Dec. 18, 2014, which claims priority to U.S. Provisional Patent Application No. 62/085,970, entitled "Exchanging Ranging and Location Information Among Peer-to-Peer Device," filed on Dec. 1, 2014, the disclosures of which are incorporated herein by reference in their entireties.

TECHNICAL FIELD

This disclosure generally relates to systems and methods for exchanging ranging and location information among peer-to-peer devices.

BACKGROUND

User devices, such as phones and tablets, have become increasingly mobile and have an increased capability to be connected to the Internet from many different places. User devices are able to communicate with other user devices by utilizing different technologies, such as wireless networks, cellular networks, peer-to-peer networks and the like. In many of the technologies, a user device may connect to or through a central device, such as a cellular tower or remote server and may obtain information through the central device. However, such an architecture may increase the cost in efficiency in the exchange of data between user devices and may increase network traffic.

BRIEF DESCRIPTION OF THE DRAWINGS

The detailed description is set forth with reference to the accompanying drawings. The use of the same reference numerals indicates similar or identical components or elements; however, different reference numerals may be used as well to indicate components or elements which may be similar or identical. Various embodiments of the disclosure may utilize elements and/or components other than those illustrated in the drawings, and some elements and/or components may not be present in various embodiments. Depending on the context, singular terminology used to describe an element or a component may encompass a plural number of such elements or components and vice versa.

DETAILED DESCRIPTION

This disclosure relates to, among other things, systems, methods, computer-readable media, techniques and methodology for exchanging ranging and location data among peer-to-peer user devices. By utilizing a neighbor awareness network (NAN), users of NAN-enabled user device may be able to meet new people, discover other nearby user device(s) and/or service(s) and interact with them and their locally relevant content. By providing a mechanism for user device(s) to discover other user device(s) and/or service(s) in close proximity through the NAN, users may be provided a more engaging and interactive experience without the time or processing delay that may occur through proximity-based discovery and networking techniques that utilize central stations or other types of central processing and network management.

In some embodiments, a NAN-enabled device may broadcast a discovery beacon frame. The discovery beacon frame may contain data that indicates when a discovery window. A discovery window may be a time slot at which user devices may communicate with each other for discovery and exchanging of data. Nearby NAN-enabled user devices may receive the discovery beacon frame and may exchange synchronization beacon frames with the NAN-enabled user device that broadcast the discovery beacon frame to ensure time synchronization between the devices. The synchronization beacon frames may be sent during the advertised discovery window indicated in the discovery beacon frames. After the devices have synchronized their time, one of the NAN-enabled user device(s) may transmit a request frame to another NAN-enabled requesting ranging and/or location information of the receiving user device. Location information may indicate a specific geographic location of a user device whereas ranging information may indicate an approximate distance of a user device from the requesting user device. The user device that receives the request may transmit the ranging and/or location data in the form of a response frame. In some embodiments, the data may be transmitted using fine timing measurement (FTM) techniques. In some embodiments, the ranging and/or location data may be transmitted in over a peer-to-peer connection between devices that become aware of each other via the NAN.

In some embodiments, ranging data and/or location data information may be transmitted before or after association and authentication between NAN-enabled user devices. In some embodiments, location and/or ranging request and response frames may be transmitted with encryption or unprotected, based at least in part on security and privacy requirements and policies of the user devices. In some embodiments, the ranging and location information of user devices may be transmitted in the channels and time slots that are indicated in the further Service Discovery Availability attributes transmitted within the NAN service discovery frame. In some embodiments, the request and response frames may be defined as public action frames. For example, they may be WFA vendor specific actions frames or a peer-to-peer action frame.

Various illustrative embodiments have been discussed above. These and other example embodiments of the disclosure will be described in more detail hereinafter through reference to the accompanying drawings. The drawings and the corresponding description are provided merely for illustration and are not intended to limit the disclosure in any way. It should be appreciated that numerous other embodiments, variations, and so forth are within the scope of this disclosure.

Illustrative Use Cases and System Architecture

Figure 1:
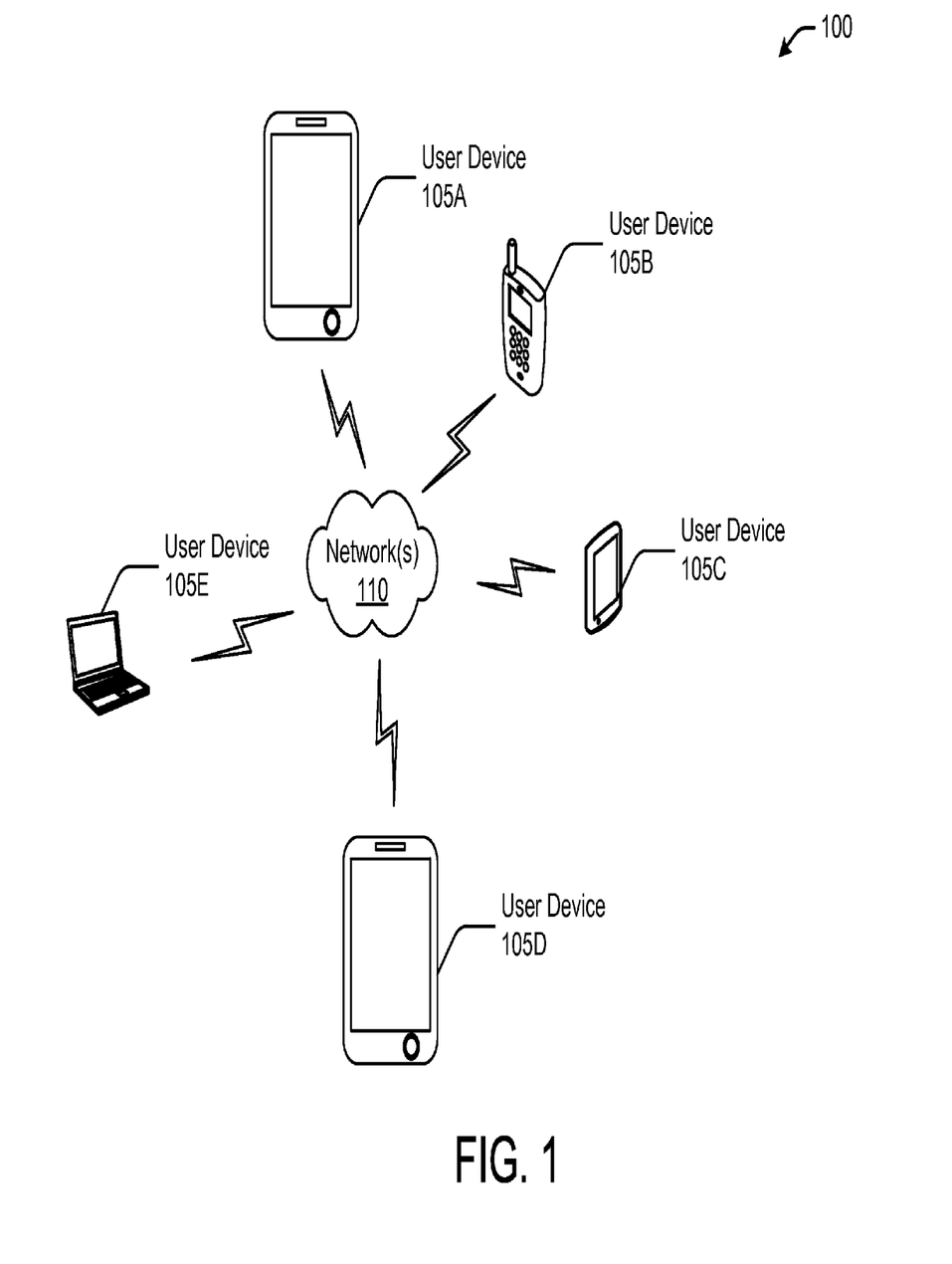
FIG. 1 depicts an illustrative data flow between various components of an illustrative system architecture for exchanging ranging and location data among peer-to-peer devices in accordance with one or more embodiments of the disclosure.

FIG. 1 depicts an illustrative architecture 100 of various components of a system for exchanging ranging and location information among peer-to-peer user devices in accordance with one or more embodiments of the disclosure. Multiple user device(s) 105A-105E (collectively 105) communicative over one or more network(s) 110 in a neighbor awareness network (NAN) are illustratively depicted in FIG. 1. If multiple user device(s) 105 are connected through a NAN, they may be referred to as a NAN cluster. The user device(s) 105 may communicate with other user device(s) in a NAN to exchange ranging and/or location information. In some embodiments, location information may be data that indicates a geographic location of a user device 105. In some embodiments, ranging information may be data that indicates the distance between two user device(s) 105. In some embodiments, the user device(s) 105 may utilize a NAN service discovery frame to look for services from other NAN-enabled user device(s) and make services discoverable for other NAN-enabled user device(s) 105. In some embodiments, NAN service discovery frames may include PUBLISH and SUBSCRIBE messages. In some embodiments, PUBLISH and SUBSCRIBE are NAN service capabilities and functions. In some embodiments, a PUBLISH message in a NAN service discovery frame makes its service discoverable by other NAN-enabled user device(s) 105 operating in the same NAN cluster in an unsolicited manner. This process may be referred to as unsolicited discovery. A PUBLISH message may be transmitted as solicited or unsolicited. A PUBLISH instance may be configured as "Solicited Only," where a PUBLISH message may be transmitted only in response to a received request, "Unsolicited Only," where a PUBLISH message may be transmitted to any user device 105 in the NAN cluster capable of receiving the message, or "Solicited and Unsolicited," which is a combination of both.

In some embodiments, a SUBSCRIBE instance may be configured to operate either in a passive mode or active mode. In some embodiments, a SUBSCRIBE instance may process received PUBLISH messages. In some embodiments, SUBSCRIBE message may be transmitted in active mode. In some embodiments, a SUBSCRIBE message within a NAN service discovery frame may be used to actively solicit availability of specific services from other NAN-enabled user device(s) 105. For example, NAN-enabled user device 105A may broadcast a NAN service discovery frame to the other user device(s) 105B-105E to request that user device(s) 105 to transmit a NAN service discovery frame with a PUBLISH message when response criteria are met. This may be known as solicited discovery. A mechanism for a user application to gather selected types of information about capabilities and services of other NAN Devices.

In one embodiment, the request and response frames for ranging and/or location information of user device(s) may utilize the P2P Public Action frame format or any WFA vendor specific action frame format. If the request and response frames use the P2P public action frame format, the OUI subtype may be set to a pre-determined value to uniquely identify a fine timing measurement (FTM) request frame or FTM response frame respectively. Table 1 indicates an exemplary frame format.

TABLE 1

Example Frame Format in a NAN

| Field | Size (octets) | Value (Hexadecimal) | Description |
| --- | --- | --- | --- |
| Category | 1 | 0x04 | IEEE 802.11 public action usage. |
| Action field | 1 | 0x09 | IEEE 802.11 vendor specific usage. |
| OUI | 3 | 50 6F 9A | WFA specific OUI. |
| OUI type | 1 | 0x09 (to be assigned) | Identifying the type or version of action frame. Setting to 09 indicates WFA P2P v1.0. |
| OUI Subtype | 1 | | Identifying the type of P2P public action frame. |
| Dialog Token | 1 | | Set to a nonzero value to identify the request/response transaction. |
| Elements | variable | | Including P2P IE or any information elements defined in IEEE Std 802.11-2007 [1]. |

In some embodiments, the Elements filed of the request frame may include the ranging request attribute, the location civic request attribute, and/or the location identifier request attribute. Table 2 and Table 3 depict example request and response frame format attributes.

TABLE 2

Example request frame attribute format

| Field | Size (octets) | Description |
| --- | --- | --- |
| Attribute ID | 1 | Identifies the type of attribute. |
| Length | 2 | Length of the following fields in the attribute. |
| Randomization | 2 | The Randomization Interval field specifies the upper bound of the random delay to be used prior to making the measurement, expressed in units of TUs. |
| Minimum Device Count | 1 | The Minimum Device Count field specifies the number of fine timing measurement ranges between the requested device and the devices listed Device Address List Entry. If Minimum Device Count is 0, the Ranging Report the Requested device and the Requesting device must be reported. |

TABLE 2-continued

Example request frame attribute format

| Field | Size (octets) | Description |
|---|---|---|
| Device Entry | variable | The Device List is a list of 6 Octets of MAC address. |

TABLE 3

Example response frame attribute format

| Field | Size (octets) | Description |
|---|---|---|
| Attribute ID | 1 | Identifies the type of attribute. |
| Length | 2 | Length of the following fields in the attribute. |
| Ranging Entry Count | 1 | The Range Entry Count field indicates the number of Range Entry fields |
| Range Entry | M × 16 | As defined in 802.11mc - D3.0. BSSID shall be replaced by Device address. Measurement Start Time shall be replaced by NAN cluster TSF. |
| Error Entry Count | 1 | The Error Entry Count field indicates the number of Error Entry fields |
| Error Entry | N × 11 | As defined in 802.11mc - D3.0. BSSID shall be replaced by Device address. Measurement Start Time shall be replaced by NAN cluster TSF. |

The user device(s) 105 may include any suitable processor-driven computing device capable of WiFi and non-WiFi access, including, but not limited to, tablet computing devices, electronic book (e-book) readers, netbook computers, notebook computers, laptop computers, Ultrabook™ computers, personal digital assistants (PDA), smart phones, web-enabled televisions, video game consoles, set top boxes (STB), digital video recorder (DVR) systems, combinations thereof, or the like. For ease of explanation, the user device(s) 105 may be described herein in the singular; however, it should be appreciated that multiple user device(s) 105 may be provided.

Any of the user device(s) 105 may be configured to communicate with each other via one or more network(s) 110. The network(s) 110 may include, but are not limited to, any one or a combination of different types of suitable communications networks such as, for example, cable networks, public networks (e.g., the Internet), private networks, wireless networks, cellular networks, or any other suitable private and/or public networks. Further, the network(s) 110 may have any suitable communication range associated therewith and may include, for example, global networks (e.g., the Internet), metropolitan area networks (MANs), wide area networks (WANs), local area networks (LANs), wireless personal area networks (WPANs), or personal area networks (PANs). In addition, the network(s) 110 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof.

Figure 2:
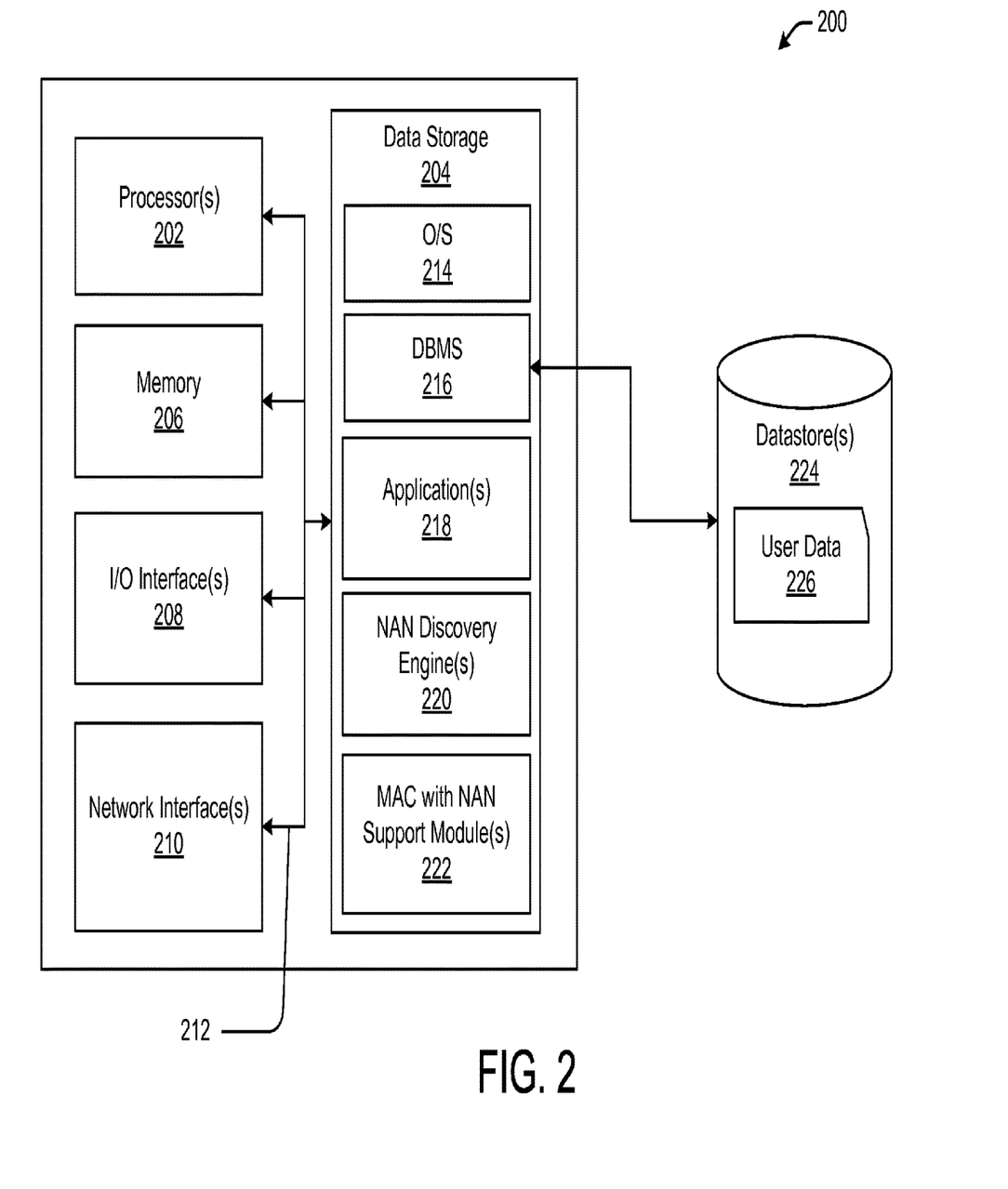
FIG. 2 is a block diagram including various hardware and software components of the illustrative system architecture depicted in FIG. 1 in accordance with one or more embodiments of the disclosure.

FIG. 2 is a schematic block diagram of an illustrative user device 200 that may be used to perform any of the data processing and user device configuration described herein in accordance with one or more example embodiments of the disclosure. In an illustrative configuration, the user device 200 may include one or more processors (processor(s)) 202, one or more memory devices 206 (generically referred to herein as memory 206), one or more input/output ("I/O") interface(s) 208, one or more network interfaces 210, and data storage 204. The user device 200 may further include one or more buses 212 that functionally couple various components of the user device 200. In certain example embodiments, the user device 200 may be a mobile device that may include one or more antennas (not shown) including, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 212 may include at least one of a system bus, a memory bus, an address bus, or a message bus, and may permit exchange of information (e.g., data (including computer-executable code), signaling, etc.) between various components of the user device 200. The bus(es) 212 may include, without limitation, a memory bus or a memory controller, a peripheral bus, an accelerated graphics port, and so forth. The bus(es) 212 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 206 of the user device 200 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 206 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 206 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 204 may include removable storage and/or non-removable storage including, but not limited to, magnetic storage, optical disk storage, solid-state storage, and/or tape storage. The data storage 204 may provide non-volatile storage of computer-executable instructions and other data. The memory 206 and the data storage 204, removable and/or non-removable, are examples of computer-readable storage media (CRSM) as that term is used herein.

The data storage 204 may store computer-executable code, instructions, or the like that may be loadable into the memory 206 and executable by the processor(s) 202 to cause the processor(s) 202 to perform or initiate various operations. The data storage 204 may additionally store data that may be copied to memory 206 for use by the processor(s) 202 during the execution of the computer-executable instructions. Moreover, output data generated as a result of execution of the computer-executable instructions by the processor(s) 202 may be stored initially in memory 206, and may ultimately be copied to data storage 204 for non-volatile storage.

More specifically, the data storage 204 may store one or more operating systems (O/S) 214; one or more database management systems (DBMS) 216; and one or more program modules, applications, or the like such as, for example, one or more application(s) 218, one or more NAN discovery engine(s) 220, and/or more media access control (MAC) with NAN support module(s) 222. The data storage 204 may further store any of variety of other types of modules. Further, any program modules stored in the data storage 204 may include one or more sub-modules. Further, any data stored in the data storage 204 may be loaded into the memory 606 for use by the processor(s) 202 in executing computer-executable code. In addition, any data potentially stored in one or more datastores 224 (e.g., user data 226) may be accessed via the DBMS 216 and loaded in the memory 206 for use by the processor(s) 202 in executing computer-executable code.

The processor(s) 202 may be configured to access the memory 206 and execute computer-executable instructions loaded therein. For example, the processor(s) 202 may be configured to execute computer-executable instructions of the various program modules of the user device 200 to cause or facilitate various operations to be performed in accordance with one or more embodiments of the disclosure. The processor(s) 202 may include any suitable processing unit capable of accepting data as input, processing the input data in accordance with stored computer-executable instructions, and generating output data. The processor(s) 202 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 202 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 202 may be capable of supporting any of a variety of instruction sets.

Referring now to functionality supported by the various program modules depicted in FIG. 2, the application(s) 218 may include computer-executable instructions, code, or the like that, responsive to execution by one or more of the processor(s) 202, may obtain data, process and/or generate data, and present data to a user of the user device 200. In some embodiments, the application(s) 218 may utilize ranging data and/or location data of other user devices 105 to process, generate, and/or present data to a user of the user device 200. In some embodiments, the ranging data and/or location data of other use device(s) 200 may be obtained via the neighbor awareness network methods described herein.

The NAN discovery engine(s) 220 may include computer-executable instructions, code, or the like that, responsive to execution by one or more of the processor(s) 202, may provide publish and subscribe services to application(s) 218 for service discovery purposes. Additionally, the NAN discovery engine(s) may generate and/or facilitate transmission of different type of frames in a NAN environment, such as NAN service discovery frames, discovery beacon frames, synchronization beacon frames, and the like.

The MAC with NAN support module(s) 222 may include computer-executable instructions, code, or the like that, responsive to execution by one or more of the processor(s) 202, may provide the means for NAN-enabled user device(s) 105 to synchronize in time and frequency to provide common availability periods for service discovery frames from/to the NAN discovery engine(s) 222. The MAC with NAN support module 222 may provide addressing and channel access control mechanisms that make it possible for NAN-enabled user device(s) 105 to communicate within a multiple access network that incorporates a shared medium, such as Ethernet. In some embodiments, the MAC with NAN support module(s) 222 may coordinate communication of NAN frames (e.g., discovery beacon frames, synchronization beacon frames, service discovery frames, etc.) to other NAN-enabled user device(s) 105 and manage time and frequency data associated with the NAN environment in a cluster of NAN-enabled user device(s) 105.

Referring now to other illustrative components depicted as being stored in the data storage 204, the O/S 214 may be loaded from the data storage 204 into the memory 206 and may provide an interface between other application software executing on the device 200 and hardware resources of the device 200. More specifically, the O/S 214 may include a set of computer-executable instructions for managing hardware resources of the device 200 and for providing common services to other application programs (e.g., managing memory allocation among various application programs). The O/S 214 may include any operating system now known or which may be developed in the future including, but not limited to, any server operating system, any mainframe operating system, or any other proprietary or non-proprietary operating system.

The DBMS 216 may be loaded into the memory 206 and may support functionality for accessing, retrieving, storing, and/or manipulating data stored in the memory 206, data stored in the data storage 204, and/or data stored in the one or more datastores 224. The DBMS 216 may use any of a variety of database models (e.g., relational model, object model, etc.) and may support any of a variety of query languages. The DBMS 216 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the user device 200 is a mobile device, the DBMS 216 may be any suitable light-weight DBMS optimized for performance on a mobile device. Referring to the example types of data depicted as being stored in the datastore(s) 224, the user data 226 may include kind of data associated with a specific user device 200, such as user preferences, application data generated by one or more application(s) 218 and associated with a user of the user device 200, etc. It should be appreciated that "data," as that term is used herein, includes computer-executable instructions, code, or the like.

Referring now to other illustrative components of the device 200, the one or more input/output (I/O) interfaces 208 may facilitate the receipt of input information by the device 200 from one or more I/O devices as well as the output of information from the device 200 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the device 200 or may be separate. The I/O devices may further include, for example, any number of peripheral devices such as data storage devices, printing devices, and so forth.

The I/O interface(s) 208 may also include an interface for an external peripheral device connection such as universal serial bus (USB), FireWire, Thunderbolt, Ethernet port or other connection protocol that may connect to one or more networks. The I/O interface(s) 208 may also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The user device 200 may further include one or more network interfaces 210 via which the user device 200 may communicate with any of a variety of other systems, platforms, networks, devices, and so forth. Such communication may occur via one or more networks including, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

Any of the user device(s) 105 may include one or more communications antennae (not pictured). Communications antenna may be any suitable type of antenna corresponding to the communications protocols used by the user device(s) 105. Some non-limiting examples of suitable communications antennas include Wi-Fi antennas, IEEE 802.11 family of standards compatible antennas, directional antennas, non-directional antennas, dipole antennas, folded dipole antennas, patch antennas, multiple-input multiple-output (MIMO) antennas, or the like. The communications antenna may be communicatively coupled to a radio component to transmit and/or receive signals, such as communications signals to and/or from the user devices 105.

Any of the user device(s) 105 may include transmit/receive (transceiver) or radio components may include any suitable radio and/or transceiver for transmitting and/or receiving radio frequency (RF) signals in the bandwidth and/or channels corresponding to the communications protocols utilized by any of the user device(s) 105 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n), 5 GHz channels (e.g. 802.11n, 802.11ac), or 60 GHZ channels (e.g. 802.11ad). In some embodiments, non-Wi-Fi protocols may be used for communications between devices, such as Bluetooth, dedicated short-range communication (DSRC), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

Those of ordinary skill in the art will appreciate that any of the components of the architecture 200 may include alternate and/or additional hardware, software or firmware components beyond those described or depicted without departing from the scope of the disclosure. More particularly, it should be appreciated that software, firmware or hardware components depicted or described as forming part of any of the illustrative components of the architecture 200, and the associated functionality that such components support, are merely illustrative and that some components may not be present or additional components may be provided in various embodiments. While various program modules have been depicted and described with respect to various illustrative components of the architecture 200, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, firmware and/or hardware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Further, while certain modules may be depicted and described as sub-modules of another module, in certain embodiments, such modules may be provided as independent modules.

Figure 3:
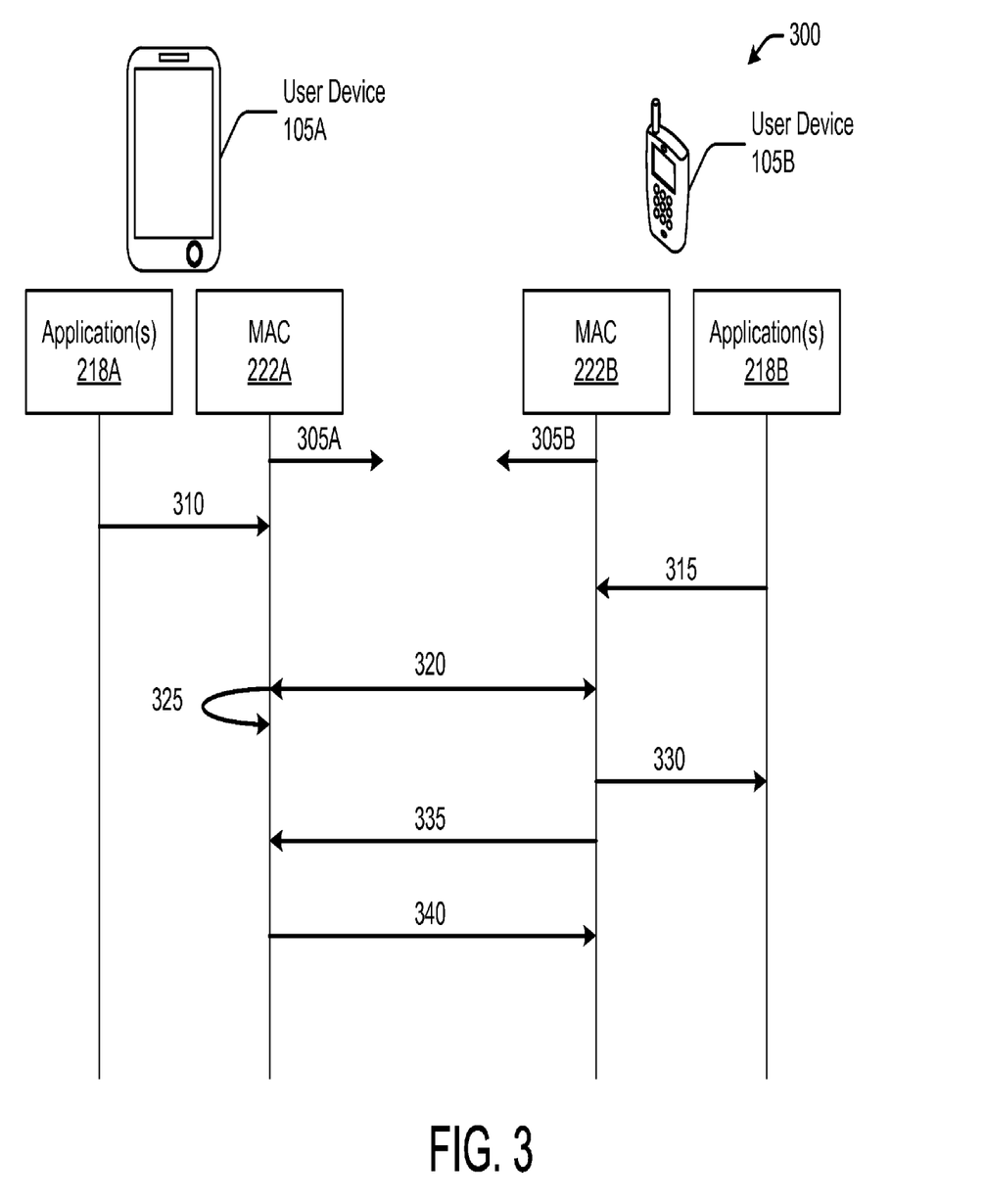
FIG. 3 is a data flow diagram of an illustrative method for exchanging ranging and location data among peer-to-peer devices in accordance with one or more embodiments of the disclosure.

Those of ordinary skill in the art will appreciate that the illustrative networked architecture 200 is provided by way of example only. Numerous other operating environments, system architectures, and device configurations are within the scope of this disclosure. Other embodiments of the disclosure may include fewer or greater numbers of components and/or devices and may incorporate some or all of the functionality described with respect to the illustrative architecture 200, or additional functionality.

Illustrative Data and Process Flows FIG. 3 is a data flow diagram of an illustrative method 300 for exchanging ranging and location data among peer-to-peer devices in accordance with one or more embodiments of the disclosure. User device 105A may be a PUBLISHER and user device 105B may be a SUBSCRIBER. User device(s) 105A and 105B may be in communication in a NAN where one or both of the user device(s) broadcast a discovery beacon frame to advertise the presence of a NAN cluster. In some embodiments, the discovery beacon frames may be broadcast at periodic intervals so that discovery by other NAN-enabled user device(s) 105 may be through passive scanning. In some embodiments, the discovery beacon frames may be include discovery window timing information. A discovery window may be a time slot at which NAN-enabled user device(s) 105 may communicate with each other for discovery and exchanging of data.

At exchanges 305A and 305B, the MAC 222A of user device 105A and the MAC 222B of user device 105B may broadcast and receive respective synchronization beacon frames. In some embodiments, the synchronization beacon frames may be used to ensure time synchronization within a NAN cluster. In some embodiments, synchronization beacon frames may be transmitted during a discovery window of the NAN cluster.

At exchange 310, one or more application(s) 218A may transmit a message to the MAC 222A to advertise or publish a service available on user device 105A. At exchange 315, one or more applications(s) 218B may transmit a message to the MAC 222B to find a specific service based on one or more specified criteria. At exchange 320, NAN service discovery frames may be exchanged between user device 105A and 105B. In some embodiments, the subscriber (e.g., user device 105B) may be in active mode and solicit services by broadcasting a NAN service discovery frame to solicit services.

At exchange 325, the MAC module 222A may receive NAN service discovery frame from 105B and may perform local matching (e.g., service identifier matching, comparing specified criteria from the request to characteristics of the available service) to identify whether the services requested by the user device 105B match the services available on user device 105A.

At exchange 330, the MAC 222B may transmit an indication to the one or more requesting application(s) 218B the results obtained from the PUBLISH message received from user device 105A in response to the SUBSCRIBE message from user device 105B. At exchange 335, the MAC 222B may request ranging and/or location data from user device 105A by transmitting a request frame. At exchange 340, the MAC 222A may provide the requested ranging and/or location data in a response frame. In some embodiments, the request and response frames may be transmitted in the channels and timeslots that are indicated in the Further Service Discovery Availability attribute in the NAN service discovery frame of exchange 320. User device 105B may transmit the FTM ranging request frame in the availability indicated by the requesting device (e.g., user device 105B).

In some embodiments, the data exchanged between user device 105A and 105B are unprotected or unencrypted. In some embodiments, the request and response frames may be transmitted with protection (e.g., encryption) or plain text, which depends on the security policies associated with the user device(s) 105A, 105B.

Figure 4:
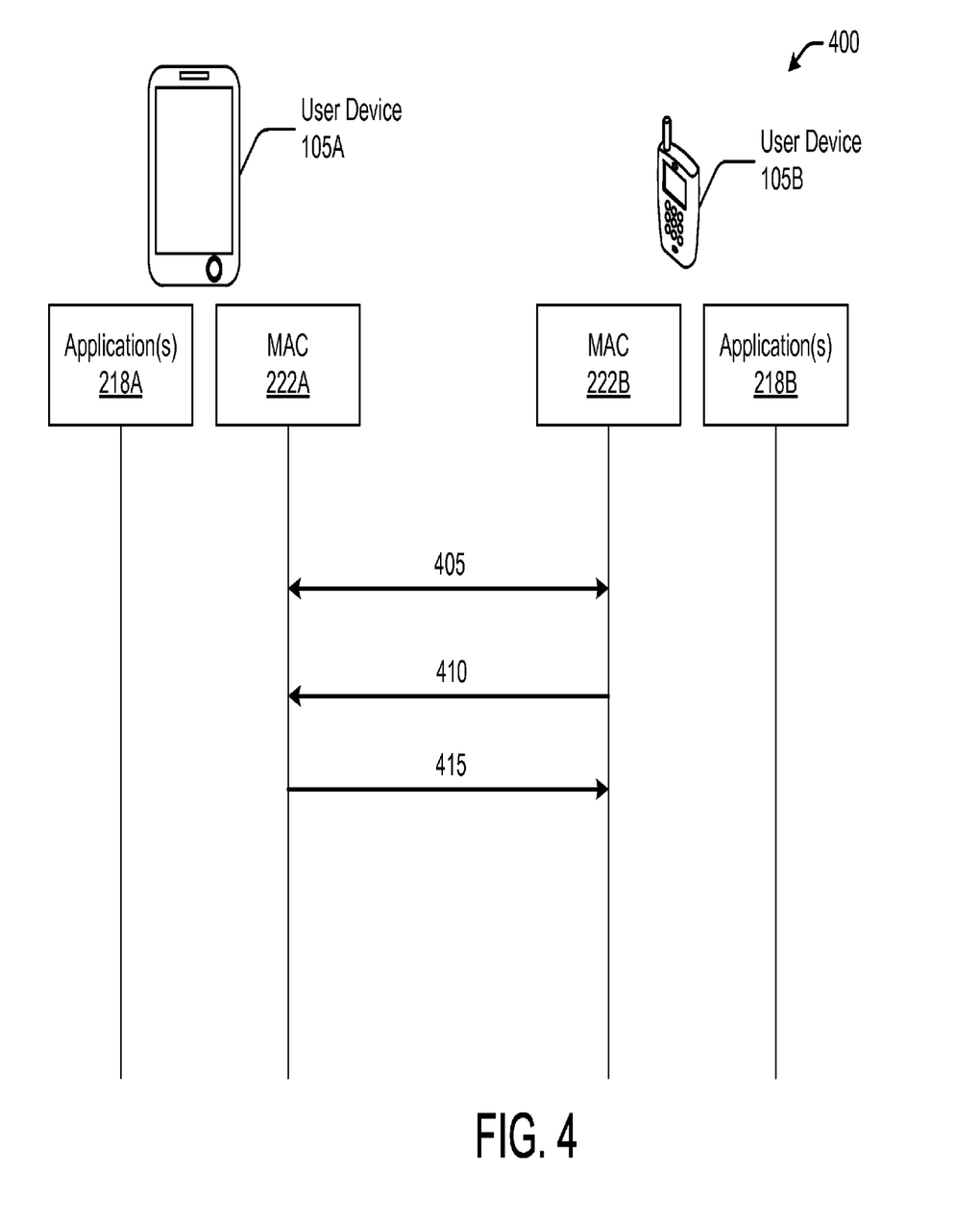
FIG. 4 is a data flow diagram of an illustrative method for exchanging ranging and location data among peer-to-peer devices using peer-to-peer connections in accordance with one or more embodiments of the disclosure.

FIG. 4 is a data flow diagram of an illustrative method 400 for exchanging ranging and location data among peer-to-peer devices using peer-to-peer connections in accordance with one or more embodiments of the disclosure. At exchange 405, a secure peer-to-peer connection may be established between user device 105A and user device 105B. In some embodiments, the secure peer-to-peer connection may be established using any known techniques for secure connections for peer-to-peer devices. At exchange 410, the MAC 222B may request ranging and/or location data from user device 105A by transmitting a request frame. At exchange 415, the MAC 222A may provide the requested ranging and/or location data in a response frame. In some embodiments, the data exchanged between user device 105A and 105B are protected and/or encrypted as a result of transmitting the data over a secure peer-to-peer connection (e.g., the operating channel of the secure peer-to-peer connection).

Figure 5:
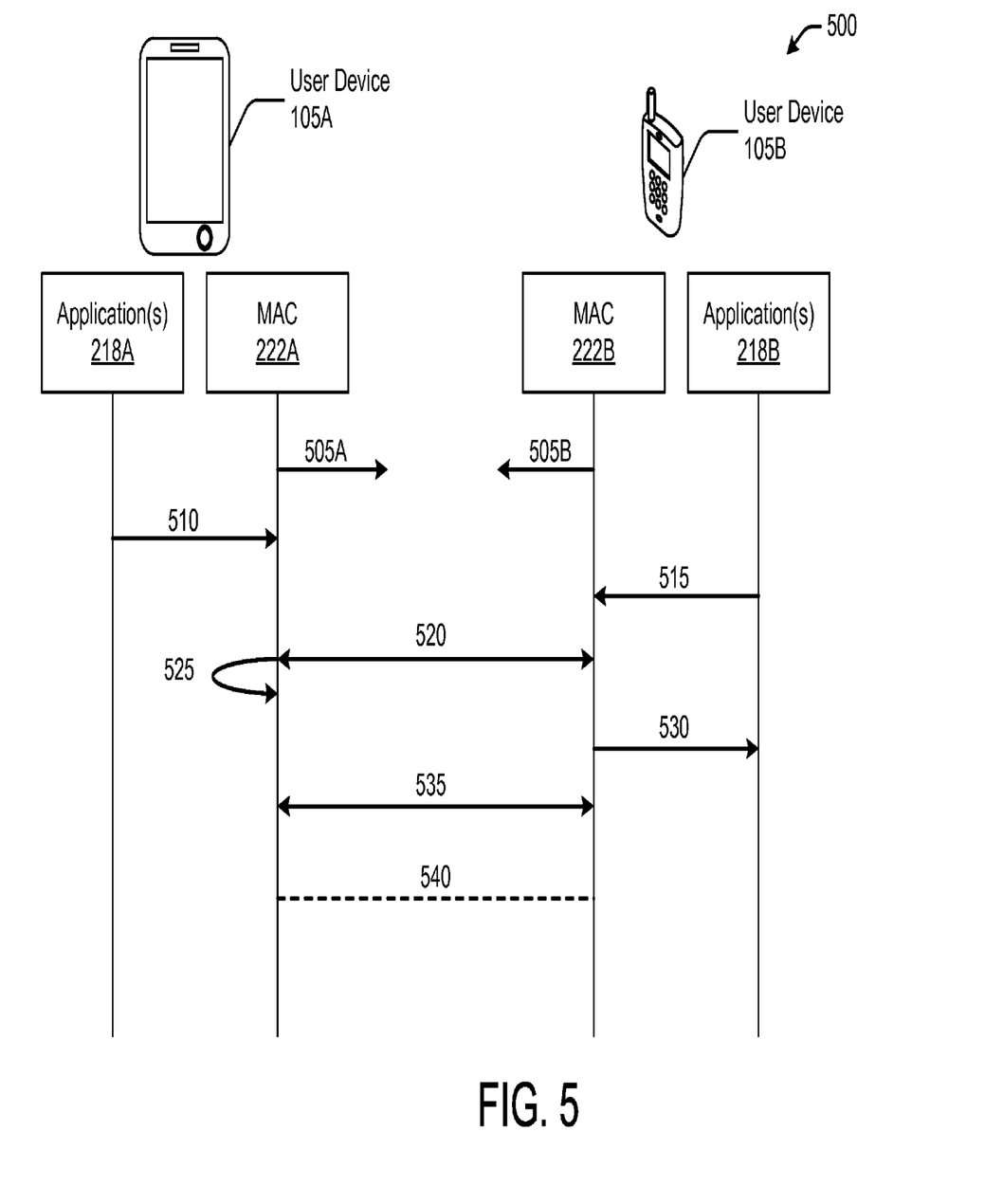
FIG. 5 is a data flow diagram of an illustrative method for exchanging ranging and location data among peer-to-peer devices using fine timing measurement techniques in accordance with one or more embodiments of the disclosure.

FIG. 5 is a data flow diagram of an illustrative method 500 for exchanging ranging and location data among peer-to-peer devices using fine timing measurement techniques in accordance with one or more embodiments of the disclosure. At exchanges 505A and 505B, the MAC 222A of user device 105A and the MAC 222B of user device 105B may broadcast and receive respective synchronization beacon frames. In some embodiments, the synchronization beacon frames may be used to ensure time synchronization within a NAN cluster. In some embodiments, synchronization beacon frames may be transmitted during a discovery window of the NAN cluster. At exchange 510, one or more application(s) 218A may transmit a message to the MAC 222A to advertise or publish a service available on user device 105A. At exchange 515, one or more applications(s) 218B may transmit a message to the MAC 222B to find a specific service based on one or more specified criteria. At exchange 520, NAN service discovery frames may be exchanged between user device 105A and 105B. In some embodiments, the subscriber (e.g., user device 105B) may be in active mode and solicit services by broadcasting a NAN service discovery frame to solicit services. At exchange 525, the MAC module 222A may receive NAN service discovery frame from 105B and may perform local matching (e.g., service identifier matching, comparing specified criteria from the request to characteristics of the available service) to identify whether the services requested by the user device 105B match the services available on user device 105A. At exchange 530, the MAC 222B may transmit an indication to the one or more requesting application(s) 218B the results obtained from the PUBLISH message received from user device 105A in response to the SUBSCRIBE message from user device 105B. At exchange 535, the MAC 222B may request ranging and/or location data from user device 105A by transmitting a request frame. At exchange 540, the MAC 222A may determine the ranging data using fine time measuring (FTM) techniques to determine the approximate distance between user device 105A and user device 105B by measuring the time delay based on messages exchanged between the devices. In some embodiments, MAC 222A may calculate the approximate ranging data and may then transmit the calculated data in a response frame transmitted to user device 105B. In some embodiments, a request frame may not be necessary as the request to receive FTM ranging data may be indicated in the NAN service discovery frame at exchange 520.

Figure 6:
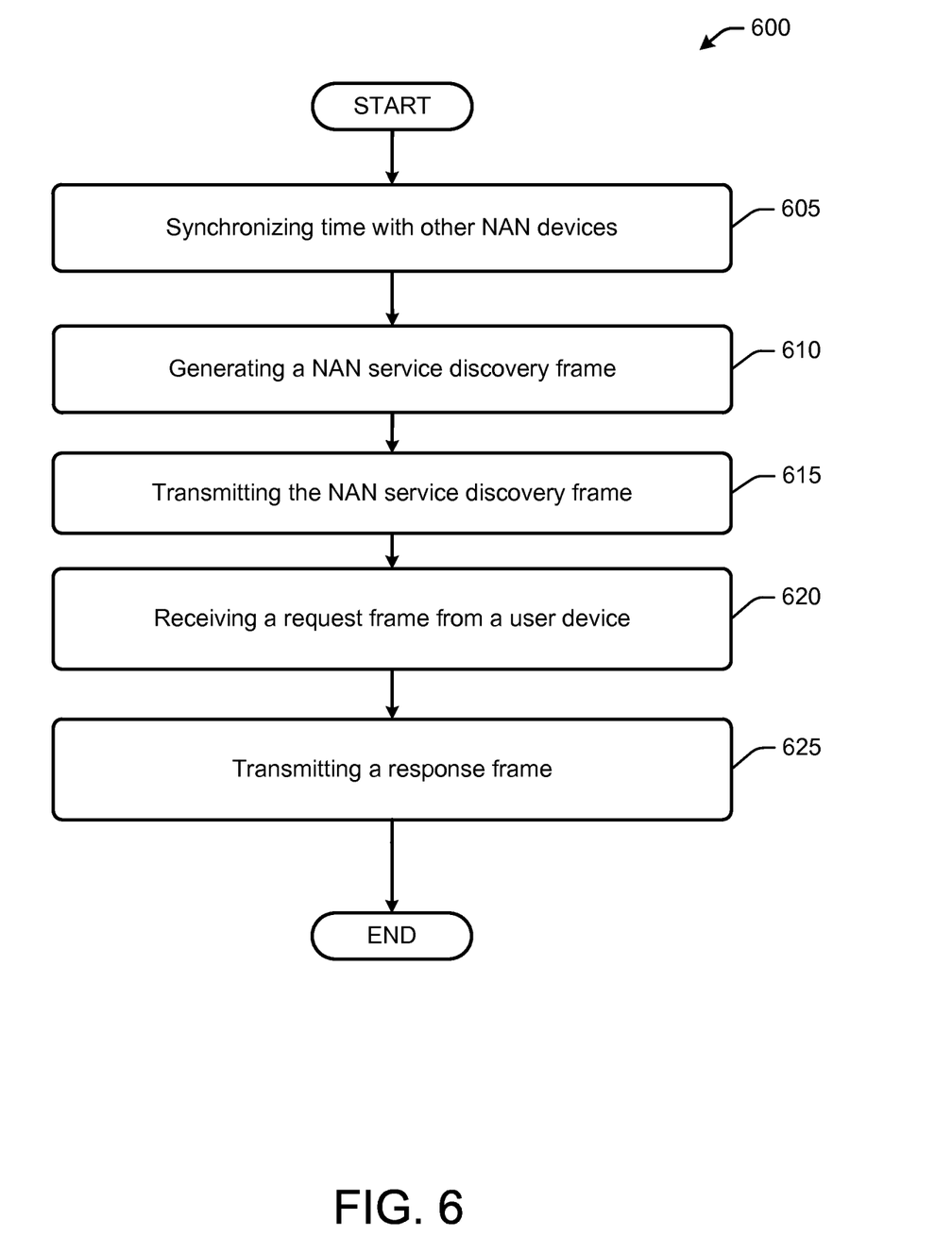
FIG. 6 is a process flow diagram of an illustrative method for exchanging ranging and location data among peer-to-peer devices in accordance with one or more embodiments of the disclosure.

FIG. 6 is a process flow diagram of an illustrative method for exchanging ranging and location data among peer-to-peer devices in accordance with one or more embodiments of the disclosure. At block 605, the MAC a first NAN-enabled user device 105A may synchronize time with a second NAN-enabled user devices 105B. The NAN discovery engine 220 of the first user device 105A may generate and broadcast a synchronization beacon frame to NAN-enabled user devices in close proximity to the user device 105A. The synchronization beacon frame may be sent during the discovery windows of the NAN-enabled user devices 105 and may ensure time synchronization within a NAN cluster of user device(s) 105.

At block 610, a NAN service discovery frame may be generated by the first user device 105A. The NAN service discovery frame may be generated by the NAN discovery engine 220 of the first user device 105A. At block 615, the NAN service discovery frame may be transmitted by the first user device 105A. In some embodiments, the NAN discovery frame may be broadcast to the NAN cluster of user device(s) 105 by the MAC with NAN support module 222 of the first user device 105A. In some embodiments, the NAN cluster of user device(s) 105 may include the second user device 105B, which may receive the NAN service discovery frame broadcast by the first user device 105A. The NAN service discovery frame may be transmitted in the discovery windows of the NAN cluster of user devices 105.

At block 620, a request frame may be received from the second user device 105B. In some embodiments, the NAN discovery engine 220 of the second user device 105B may receive the NAN service discovery frame from the first user device 105A and may identify the discovery window and transmit the request frame during discovery window.

At block 625, a response frame may be generated and transmitted to the second user device 105B that sent the request frame. In some embodiments, the response frame may include ranging and/or location data associated with the first user device 105A. In some embodiments, the response frame may be transmitted through the FTM techniques described herein or via an establish P2P connection between the NAN-enabled user devices 105A, 105B. In some embodiments, the NAN discovery engine 220 of the second user device 105B may process the response frame to obtain the ranging and/or location data and make the data available to one or more applications 218 of the user device 105B.

In one embodiment, a computer-readable medium may store computer-executable instructions which, that when executed by a processor, may cause the processor to perform operations comprising synchronizing, by a first user device, a time associated with a second user device; generating, by the first user device, a neighbor awareness network (NAN) service discovery frame comprising channel and time slot information; transmitting, by the first user device, the NAN service discovery frame to the second user device; receiving, by the first user device from the second user device, a request frame for ranging or location information of the first device or a second NAN service discovery frame comprising a request for the ranging and location information of the first device; and transmitting, by the first user device, a response frame comprising the ranging or location information in response to receiving the request frame or the second NAN service discovery frame.

In one aspect of an embodiment, the request frame and the response frame may be encrypted. In one aspect of an embodiment, the request frame and the response frame may be public action frames. In one aspect of an embodiment, the first user device may be a publisher. In one aspect of an embodiment, the second user device may be a subscriber. In one aspect of an embodiment, synchronizing the time associated with the second user device may further comprise transmitting, by the first user device, a synchronization beacon to the second user device in a discovery window of the NAN. In one aspect of an embodiment, the operations may further comprise transmitting, by the first user device, a discovery beacon frame at periodic intervals, wherein the discovery beacon frame comprises information associated with a discovery window of a NAN.

In another embodiment, a method may comprise synchronizing, by a first user device, a time associated with a second user device; generating, by the first user device, a neighbor awareness network (NAN) service discovery frame comprising channel and time slot information; transmitting, by the first user device, the NAN service discovery frame to the second user device; receiving, by the first user device from the second user device, a request frame for ranging or location information of the first device or a second NAN service discovery frame comprising a request for the ranging and location information of the first device; and transmitting, by the first user device, a response frame comprising the ranging or location information in response to receiving the request frame or the second NAN service discovery frame.

In one aspect of an embodiment, the request frame and the response frame may be encrypted. In one aspect of an embodiment, the request frame and the response frame may be public action frames. In one aspect of an embodiment, the first user device may be a publisher. In one aspect of an embodiment, the second user device may be a subscriber. In one aspect of an embodiment, synchronizing the time associated with the second user device further comprises transmitting, by the first user device, a synchronization beacon to the second user device in a discovery window of the NAN. In one aspect of an embodiment, the method may further comprise transmitting, by the first user device, a discovery beacon frame at periodic intervals, wherein the discovery beacon frame comprises information associated with a discovery window of a NAN.

In another embodiment, a device may include at least one antenna; at least one transceiver; at least one memory storing computer-executable instructions; and at least one processor, wherein the at least one processor is configured to access the at least one memory and to execute the computer-executable instructions to synchronize a time associated with a user device; generate a neighbor awareness network (NAN) service discovery frame comprising channel and time slot information; transmit the NAN service discovery frame to the user device; receive, from the user device, a request frame for ranging or location information of the first device or a second NAN service discovery frame comprising a request for the ranging and location information; and transmit a response frame comprising the ranging or location information in response to receiving the request frame or the second NAN service discovery frame.

In one aspect of an embodiment, the request frame and the response frame may be encrypted. In one aspect of an embodiment, the request frame and the response frame may be public action frames. In one aspect of an embodiment, the device may be a publisher. In one aspect of an embodiment, the user device may be a subscriber. In one aspect of an embodiment, synchronizing the time associated with the second user device may further comprise transmitting a synchronization beacon to the user device in a discovery window of the NAN. In one aspect of an embodiment, at least one processor may be configured to access at least one memory and to execute the computer-executable instructions to transmit a discovery beacon frame at periodic intervals, wherein the discovery beacon frame comprises information associated with a discovery window of a NAN. In one aspect of an embodiments, the first user device may be a publisher and the second user device may be a subscriber.

In another embodiment, a system may comprise at least one antenna; at least one transceiver; at least one memory storing computer-executable instructions; and at least one processor, wherein the at least one processor is configured to access the at least one memory and to execute the computer-executable instructions to synchronize a time associated with a user device of a neighbor awareness network (NAN); generate a NAN service discovery frame comprising channel and time slot information; transmit the NAN service discovery frame to the user device; receive, from the user device, a request frame for ranging or location information of the first device or a second NAN service discovery frame comprising a request for the ranging and location information; and transmit a response frame comprising the ranging or location information in response to receiving the request frame or the second NAN service discovery frame.

In one aspect of an embodiment, the request frame and the response frame may be encrypted. In one aspect of an embodiment, the request frame and the response frame may be public action frames. In one aspect of an embodiment, the response frame may be transmitted in response to the request frame or the second NAN service discovery frame from the second user device. In one aspect of an embodiment, to synchronize the time associated with the user device, the at least one processor may be configured to access the at least one memory and to execute the computer-executable instructions to transmit a synchronization beacon to the user device in a discovery window of the NAN. In one aspect of an embodiment, at least one processor may be configured to access the at least one memory and to execute the computer-executable instructions to transmit a discovery beacon frame at periodic intervals, wherein the discovery beacon frame comprises information associated with a discovery window of a NAN. In one aspect of an embodiment, the first user device may be a publisher and the second user device may be a subscriber.

In another embodiment, a system may include a means for synchronizing, by a first user device of a neighbor awareness network (NAN), a time associated with a second user device of the NAN; a means for generating a NAN service discovery frame comprising channel and time slot information; a means for transmitting the NAN service discovery frame to the second user device; a means for receiving, from the second user device, a request frame for ranging or location information of the first device or a second NAN service discovery frame comprising a request for the ranging and location information of the first device; and a means for transmitting a response frame comprising the ranging or location information in response to receiving the request frame or the second NAN service discovery frame.

In one aspect of an embodiment, the request frame and the response frame may be encrypted. In one aspect of an embodiment, the request frame and the response frame may be public action frames. In one aspect of an embodiment, the first user device may be a publisher. In one aspect of an embodiment, the second user device may be a subscriber. In one aspect of an embodiment, the means for synchronizing the time associated with the second user device may further comprise a means for transmitting a synchronization beacon to the second user device in a discovery window of the NAN. In one aspect of an embodiment, the system may include a means for transmitting a discovery beacon frame at periodic intervals, wherein the discovery beacon frame comprises information associated with a discovery window of the NAN.

In another embodiment, an apparatus may include at least one antenna; at least one transceiver; at least one memory storing computer-executable instructions; and at least one processor, wherein the at least one processor is configured to access the at least one memory and to execute the computer-executable instructions to synchronize a time associated with a user device of a neighbor awareness network (NAN); receive a NAN service discovery frame comprising channel and time slot information; transmit, to the user device based at least in part on the NAN service discovery frame, a request frame comprising a request for ranging or location information or a second NAN service discovery frame comprising the request for the ranging or location information; and receive a response frame comprising the ranging or location information.

In one aspect of an embodiment, the request frame and the response frame may be encrypted. In one aspect of an embodiment, the request frame and the response frame may be public action frames. In one aspect of an embodiment, to synchronize the time associated with the user device, the at least one processor may be configured to access the at least one memory and to execute the computer-executable instructions to transmit a synchronization beacon to the user device in a discovery window of the NAN. In one aspect of an embodiment, the at least one processor may be configured to access the at least one memory and to execute the computer-executable instructions to transmit a discovery beacon frame at periodic intervals, wherein the discovery beacon frame comprises information associated with a discovery window of a NAN.

CONCLUSION

It should be appreciated that the program modules, applications, computer-executable instructions, code, or the like depicted in this disclosure as being stored in data storage are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on a device (e.g., user device 105), and/or hosted on other computing device(s) accessible via one or more networks, may be provided to support functionality provided by the program modules, applications, or computer-executable code depicted herein and/or additional or alternate functionality. Further, functionality may be modularized differently such that processing described as being supported collectively by the collection of program modules described herein may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules described herein may be implemented, at least partially, in hardware and/or firmware across any number of devices.

It should further be appreciated that a device (e.g., user device 105) may include alternate and/or additional hardware, software, or firmware components beyond those described or depicted without departing from the scope of the disclosure. More particularly, it should be appreciated that software, firmware, or hardware components depicted as forming part of the device (e.g., user device 105) are merely illustrative and that some components may not be present or additional components may be provided in various embodiments. While various illustrative program modules have been depicted and described as software modules stored in data storage, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

One or more operations of the methods 300-600 may have been described above as being performed by one or more components of a device, or more specifically, by one or more one or more program modules executing on such a device. It should be appreciated, however, that any of the operations of methods 300-600 may be performed, at least in part, in a distributed manner by one or more other devices or systems, or more specifically, by one or more program modules, applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of any of the method 300 may be described in the context of the illustrative user device 600, it should be appreciated that such operations may be implemented in connection with numerous other system configurations.

The operations described and depicted in the illustrative methods of FIG. 3-6 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIG. 3-6 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. An initiator neighbor aware networking (NAN) device to perform ranging operations, the initiator NAN device comprising one or more processors and storage, the one or more processors coupled to the storage, the one or more processors configured to:
   cause to send a first NAN service discovery frame indicating a first frequency band and a first time slot to a first responder NAN device, and a second frequency band and a second time slot to a second responder NAN device;
   identify a second NAN service discovery frame received from the first responder NAN device, the second NAN service discovery frame indicating the first frequency band and the first time slot;
   based on the identification of the second NAN service discovery frame, cause to send a ranging request frame during the first time slot and using the first frequency band, wherein the ranging request frame comprises one or more device addresses, and wherein a first device address of the one or more device addresses is associated with the first responder NAN device;
   identify a ranging response frame received from the first responder NAN device;
   perform a fine timing measurement associated with the first responder NAN device; and
   determine, based on the fine timing measurement, a distance between the initiator NAN device and the first responder NAN device.

2. The initiator NAN device of claim 1, wherein the first NAN service discovery frame is unsolicited.

3. The initiator NAN device of claim 1, wherein the first NAN service discovery frame further indicates a time associated with the ranging request frame.

4. The initiator NAN device of claim 1, wherein the one or more processors are further configured to:
   determine, based on the second NAN service discovery frame, a ranging capability associated with the first responder NAN device, wherein to cause to send the ranging request frame is based on the determination of the ranging capability associated with the first responder NAN device.

5. The initiator NAN device of claim 1, wherein the one or more processors are further configured to determine that the initiator NAN device is to send a ranging report.

6. The initiator NAN device of claim 1, wherein the one or more processors are further configured to determine that the ranging response frame comprises an indication of location information associated with the first responder NAN device.

7. The initiator NAN device of claim 1, further comprising a transceiver configured to transmit and receive wireless signals, wherein the wireless signals comprise at least one of the ranging request frame or the ranging response frame.

8. The initiator NAN device of claim 7, further comprising at least one antenna coupled to the transceiver.

9. The initiator NAN device of claim 1, wherein the first NAN service discovery frame further indicates a ranging capability.

10. A non-transitory computer-readable medium storing computer-executable instructions which when executed by one or more processors result in performing operations comprising:
    identifying, at a first responder neighbor awareness networking (NAN) device of one or more responder NAN devices, a first NAN service discovery frame received from an initiator NAN device, the first NAN service discovery frame indicating a first frequency band and a first time slot;
    causing to send a second NAN service discovery frame to the initiator NAN device, the second NAN service discovery frame indicating the first frequency band and the first time slot;
    identifying, at the first responder NAN device, a ranging request frame received from the initiator NAN device during the first time slot and using the first frequency band based on the second NAN service discovery frame, wherein the ranging request frame comprises one or more device addresses, and wherein a first device address of the one or more device addresses is associated with the first responder NAN device;
    determining that the ranging request frame indicates location information associated with the initiator NAN device;
    causing to send a ranging response frame to the initiator NAN device; and
    performing a fine timing measurement associated with the initiator NAN device.

11. The non-transitory computer-readable medium of claim 10, wherein the first NAN service discovery frame is unsolicited.

12. The non-transitory computer-readable medium of claim 10, wherein the first NAN service discovery frame further indicates a time associated with the ranging request frame.

13. The non-transitory computer-readable medium of claim 10, the operations further comprising determining that the initiator NAN device is to send a ranging report.

14. The non-transitory computer-readable medium of claim 10, wherein the first NAN service discovery frame further indicates a ranging capability.

15. A method comprising:
    causing to send, by one or more processors of an initiator neighbor awareness networking (NAN) device, a first NAN service discovery frame indicating a first frequency band and a first time slot to a first responder NAN device, and a second frequency band and a second time slot to a second responder NAN device;
    identifying, by the one or more processors, a second NAN service discovery frame received from the first responder NAN device, the second NAN service discovery frame indicating the first frequency band and the first time slot;
    causing to send, by the one or more processors, based on the identification of the second NAN service discovery frame, a ranging request frame, wherein the ranging request frame comprises one or more device addresses, and wherein a first device address of the one or more device addresses is associated with the first responder NAN device;
    identifying, by the one or more processors, a ranging response frame received from the first responder NAN device;
    performing, by the one or more processors, a fine timing measurement associated with the first responder NAN device; and
    determining, by the one or more processors and based on the fine timing measurement, a distance between the initiator NAN device and the first responder NAN device.

16. The method of claim 15, wherein the first NAN service discovery frame is unsolicited.

17. The method of claim 15, wherein the first NAN service discovery frame further indicates a time associated with the ranging request frame.

18. The method of claim 15, wherein the method further comprises:
    determining, based on the second NAN service discovery frame, a ranging capability associated with the first responder NAN device, wherein to cause to send the ranging request frame is based on the determination of the ranging capability associated with the first responder NAN device.

19. The method of claim 15, wherein the first NAN service discovery frame further indicates a ranging capability.

* * * * *